May 4, 1948.   J. R. TURNER   2,441,107
OPTICAL PROJECTION COMPARATOR
Filed Dec. 29, 1944    2 Sheets-Sheet 1

JOHN R. TURNER
INVENTOR
BY
ATTORNEYS

May 4, 1948.　　　　J. R. TURNER　　　　2,441,107
OPTICAL PROJECTION COMPARATOR
Filed Dec. 29, 1944　　　　2 Sheets-Sheet 2
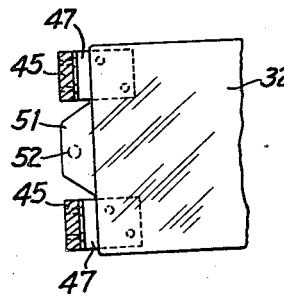
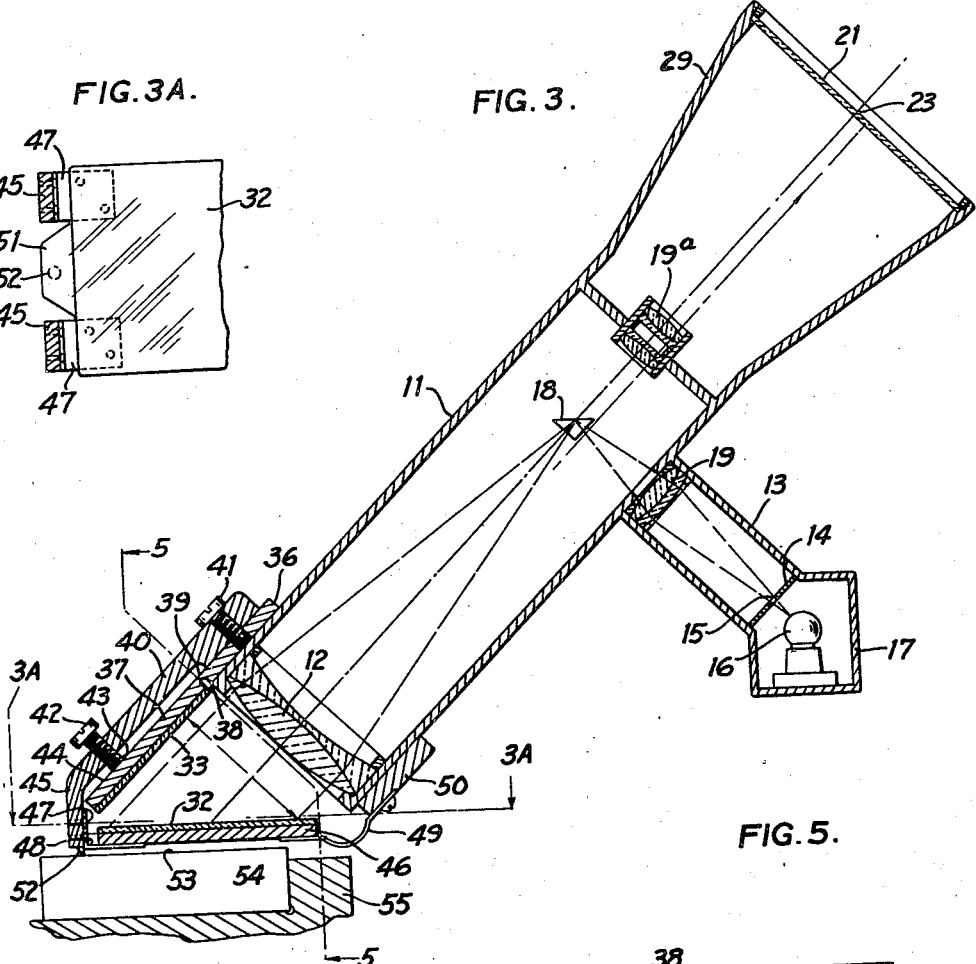
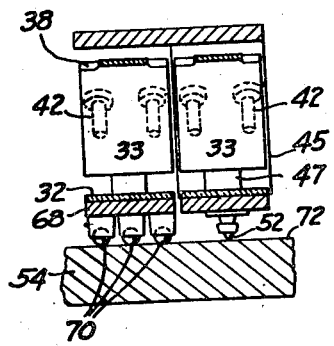
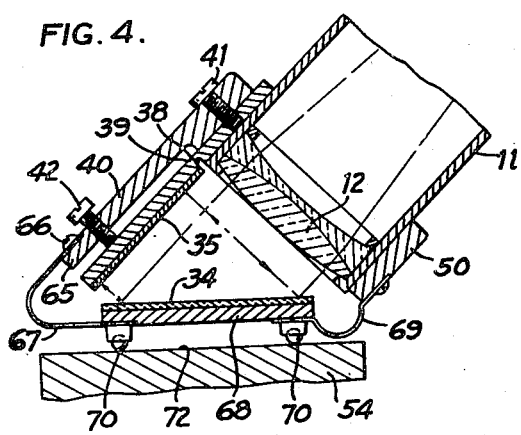
JOHN R. TURNER
INVENTOR Patented May 4, 1948

2,441,107

UNITED STATES PATENT OFFICE 2,441,107

OPTICAL PROJECTION COMPARATOR

John R. Turner, Rochester, N. Y., assignor to Eastman Kodak Company, Rochester, N. Y., a corporation of New Jersey Application December 29, 1944, Serial No. 570,328

11 Claims. (Cl. 88—24)

The present invention relates to an instrument for measuring the lineal and/or angular variations or differences of an object or surface from a standard or master object or surface. Such variations or differences are measured by means of an auto-collimating optical system which indicates the lineal variations or differences of a few millionths of an inch and the angular differences to a two seconds of an arc.

In gauging the position of a line or a surface, it is usually necessary to determine both the angular error and lineal error from a nominal position of the line or surface with respect to a specific reference such as a gauge block or master object. To measure such differences, it is customary to employ dial indicators, but for most precise work such indicators are not particularly sensitive.

The present invention has, therefore, as one of its objects, the provision of an optical comparator which utilizes an auto-collimating optical system for measuring the lineal variations (thickness) of an object from that of a standard or master object.

Another object of the invention is the provision of a comparator of the class described for measuring to a precise degree the angular or surface variation of an object from a standard or master surface.

A further object of the invention is the provision of a novel, simple, and easily adjustable viewing mechanism for zeroing the instrument when a master object or surface is being measured.

And still another object of the invention is the provision of an optical system for magnifying such variations or differences so that they may be more easily detected and the amount of such variations read off a suitable scale.

Yet another object of the invention is the provision of a comparator which comprises few parts of rugged construction which are easy to make and operate, and accurate in their interpretation.

To these and other ends, the invention resides in certain improvements and combinations of parts, all as will be hereinafter more fully described, the novel features being pointed out in the claims at the end of the specification.

In the drawings:

Fig. 3 is a view similar to Fig. 1, showing a modified form of the comparator, showing the mirror arrangement for measuring the lineal differences or variations;

Fig. 3a is a partial vertical sectional view taken substantially on the line 3a—3a of Fig. 3, showing the arrangement of the mirror and contact members by which the lineal variations are measured;

Fig. 4 is a sectional view taken through the lower end of the comparator of the type illustrated in Figs. 1 and 3 showing the mirror arrangement for measuring angular variations; and Fig. 5 is a sectional view taken substantially on line 5—5 of Fig. 3, showing the arrangement of the mirrors and viewing mechanism by which both lineal and angular variations are determined.

Similar reference numerals throughout the various views indicate the same parts.

The present invention consists of an auto-collimating telescope with two pairs of mirrors positioned in front of the telescope objective. One pair of mirrors cooperates with an object contacting member to indicate the lineal difference, such as thickness, between an object being tested and a standard or master object. The other pair of mirrors, on the other hand, cooperate with a plurality of surface-engaging members to indicate the angular difference between the surface being tested and a standard or master subject. These lineal and angular differences are projected onto a suitable viewing screen provided with suitable scales to readily indicate such differences. Each pair of mirrors is arranged to cover approximately half the aperture of the telescope objective.

Figure 1:
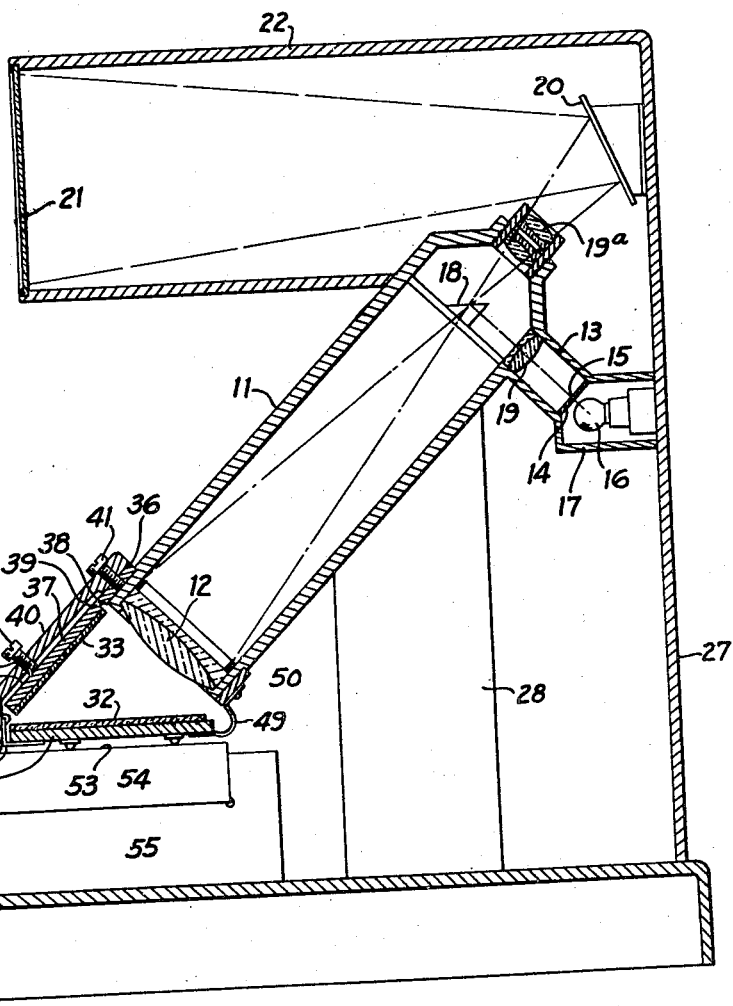
Fig. 1 is a sectional elevation view through an optical comparator constructed in accordance with the preferred embodiment of the invention, showing the arrangement of the parts for determining lineal differences.

Referring now to the drawings, Fig. 1 shows the preferred form of optical comparator which comprises an auto-collimating telescope provided with a tubular member or body portion 11 in the lower end of which is mounted the objective 12. The upper end of the member 11 has connected thereto a laterally extending tube 13 in which is mounted a suitable reticle or target preferably in the form of a plate 14 provided with a pinhole 15. The latter is illuminated by a lamp 16 positioned in a suitable housing 17 connected to one end of the tube 13. A lens 19 positioned in the opposite end of the tube 13 serves to focus the image of the pinhole 15 onto a reflecting prism 18 positioned in the member 11 and slightly off the longitudinal optical axis thereof. The focused light rays preceding from the pinhole 15 are then reflected by the prism 18 to the objective 12 and emerge from the latter in the form of parallel rays of light, as is well known.

Figure 2:
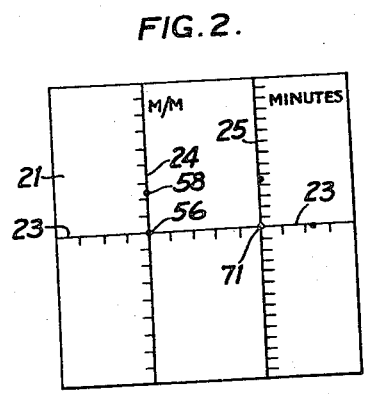
Fig. 2 is a front elevation view of the viewing screen showing the scales which indicate the lineal and angular variations of the object or objects being compared.

These parallel rays after passing through the objective 12 are doubly reflected by mirrors, to be later more fully described, positioned in front of the objective. These mirrors serve to reflect the rays back through the objective and towards the prism 18. As the latter is slightly offset to one side of the optical axis of the member 11, the reflected rays of the pinhole 15 will return just slightly off on the opposite side of the optical axis, as is well known. The reflected rays then pass through a projecting lens 19a which direct the rays onto a mirror 20 positioned in alignment with the lens 19a. The rays are reflected from the mirror 20 onto a suitable viewing screen 21 positioned at the end of the housing 22, as shown in Fig. 1. The screen 21 is provided with a horizontal reference line 23 and a pair of vertical lines 24 and 25 which cross the horizontal line as shown to provide a pair of cross reference marks or scales as is clearly apparent from an inspection of Fig. 2. The lines serve to indicate the lineal and angular variations of the object or objects being tested, as will be later described. The telescope parts and the screen housing 22 are carried by a suitable support comprising a base member 26 and a vertical member 27 extending upwardly from the base to support the lamphouse 17 and screen housing 21. A strut 28 also extends upwardly from the base 26 and engages the member 11 to support the latter.

The modifications shown in Fig. 3 differ from that illustrated in Fig. 1 only in that the viewing screen 21 is positioned in direct physical alignment with the projection lens 19a. An expanding hood or housing 29 connects the member 11 and screen 21. The support for the members illustrated in Fig. 3 is not shown, but may be the same as that illustrated in connection with Fig. 1 or any other suitable design.

The auto-collimating telescope and viewing screen arrangement shown and described are merely by way of illustration, as it is contemplated that other designs may be used. The present invention, however, relates to the mirror arrangement positioned at the lower end of the member 11 for measuring the lineal and angular variations of an object from a standard or master object. In order to measure such differences, two pairs of mirrors are utilized, each pair covering half of the aperture of the objective 12, as will be apparent from an inspection of Fig. 5. One pair of these mirrors, namely the mirrors 32 and 33, is used for measuring the lineal differences, such as variations in thickness, between an object being tested and a standard or master object. The other pair of mirrors, namely mirrors 34 and 35, (see Fig. 4), is on the other hand, utilized to measure the angular differences between an object surface being measured and a standard or master surface. As the mirror arrangements in the two modifications are the same, a description of one will suffice for both, and corresponding parts of the two embodiments will be designated by the same numerals.

Referring now to Figs. 1 and 3, the lower end of the member 11 has mounted thereon one end 36 of a plate 37 which carries the inclined mirror 33. The plate 37 and mirror 33 are thus arranged in cantilever fashion on the end of the member 11, as is apparent. The plate 37 is partly cut through, as shown at 38, to provide a flexible connection or hinge 39 between the mirror 33 and the telescope member 11. A plate 40 overlies the plate 37 and a bolt 41 serves to connect the plates 37 and 40 to the lower end of the member 11, as clearly illustrated in Figs. 1 and 3. The plate 40 is provided with a threaded opening adapted to receive an adjusting screw 42 the ends 43 of which contact the rear face 44 of the plate 37. It is now apparent that by moving the screw 42, the plate 37 and mirror 33 may be caused to move about the flexible connection or hinge 39. Such adjustment is for zeroing the instrument when the latter is adjusted for a lineal dimension (thickness) of a master object, as will be later more fully described.

The plate 40 is formed with a depending arm 45 which is connected to a plate 46 by a pair of L-shaped spring members 47 the opposite ends of which are suitably secured to the arm 45 and plate 46 respectively. The plate 46 carries the mirror 32 so that the latter is connected to the arm 45 by the spring members 47 which forms a yieldable hinge connection at 48 between one end of the mirrors 32 and the arm 45, and, hence, between the mirror 32 and the telescope member 11. The opposite end of the plate 46 rests lightly on one end of a cantilever spring 49 the other end of which is connected to a block 50 carried by the member 11. The spring 49 thus cooperates with springs 47 in supporting the weight of the plate 46 and mirror 32 and to retain these members in operative position, yet permits free movement of the mirror and plate about the flexible hinge 48. The plate 46 is provided with a tongue portion 51 which extends between the springs 47, see Fig. 3a, and carries a small depending diamond stylus 52 adapted to rest upon the upper surface 53 of an object 54 the lineal dimension or thickness of which is to be compared to a master object.

As the sensitivity of lineal measurement is in inverse ratio to the vertical distance between the stylus 52 and center line of hinge 48, the stylus should be positioned as close as possible to the hinge, as shown in the drawings. It will be noted that as the stylus 52 is also close to the hinge 48 a small movement of the stylus will produce a relatively large movement of the mirror 32. Furthermore, light rays proceeding from the pinhole 15 and passing through the objective 11 are reflected by the mirror 32 onto the mirror 33, then reflected back to the mirror 32 which re-reflects the light rays back through the objective 11 to the projecting lens 19 and thence to the viewing screen.

As is well known in optics, the movement of a reflecting surface through an angle of $\theta°$ causes a deviation of the reflected image through an angle of $2\theta°$. However, as the mirrors 32 and 33 provide a double reflection, the movement of the mirror 32 through $\theta°$ degrees will cause a deviation of $4\theta°$ degrees of the image. Further magnification may be provided by the projection lens 19a so that the differences or variations may be readily and easily read from the scales on screen 21.

The testing operation is as follows: a standard or master object is first placed on the base 26 or on a suitable block 55 supported by the base 26 to bring the upper surface of the master object into contact with the stylus 52. The screw 42 is then adjusted to zero the instrument to bring the reflected image 56 of the pinhole 15 at the intersection of the horizontal and vertical lines 23 and 24, as illustrated at 56 in Fig. 2. The standard or master object is then removed and replaced by the object 54 to be tested. The stylus 52 will then rest on the upper surface 53 of the object 54 to be tested. If the object 54 varies in thickness (lineal dimension) from the master object, the stylus 52 will be moved upwardly or downwardly depending on whether the object 54 is thicker or thinner than the master object. Such movement of the stylus will cause the mirror 32 to pivot or rotate about the hinge connection 48 to vary the angular position of the mirror 32 to thus change the path of the rays reflected therefrom to the mirror 33. The latter, in turn, will also alter the path of the rays reflected back to the mirror 32 and re-reflected from the latter. This change in the path of the reflected rays will cause the image of the pinhole 15 to move vertically along the line 24 to a position such as illustrated at 58, Fig. 2. The actual position of the image 58 caused by the object 54 will depend, of course, on both the direct and amount of variation of the lineal dimension (thickness) of the object 54 from the master object. Furthermore, as this variation is magnified four times by the double reflection in the two mirrors, 32 and 33, and may be further magnified by the lens 19a, the variation can be readily determined from the scale 24. This scale is preferably calibrated in millimeters, but obviously any other suitable calibration may be used.

Thus after the instrument has been zeroed for the master object, a plurality of objects to be tested may then be successfully and quickly positioned in place under the stylus 52 and the variation in thickness of these objects from the master can be readily read on the scale 24, the advantages of which are obvious.

In addition to measuring the lineal difference, such as the thickness variation, it is also desirable to measure angular differences or variations of a surface from a master or standard surface. The comparator of the present invention provides an arrangement by which such angular variation of one object may be measured simultaneously with or independent of the lineal variation of another object. On the other hand, the lineal and angular variation of the same object may be successively determined. These angular differences are secured by the rocking of the mirror 34 relative to the mirror 35. The mounting and adjustment of the latter to zero the instrument, as will be later more fully described, are identical to that of the mirror 33. The corresponding parts will therefore be designated by the same numerals.

Referring now to Fig. 4 wherein it is shown that the lower end 65 of the plate 40 has secured thereto, by screws 66 or other suitable fastening means, one end of a generally U-shaped spring 67 which extends under and supports one end of a plate 68 on which the mirror 34 is positioned. The other end of the plate 68 is supported by one end of a spring 69, the other end of which is connected to the member 11 in the same manner as the spring 49 above described. The plate 68 and mirror 34 are thus spring suspended and are free to move to vary the inclination or angular position of the mirror 34 relative to the mirror 35.

As is well known, three points determine a plane so that the plate 58 is provided with three depending contact points in the form of balls 70 all of which lie in a plane. It will now be apparent that if these three points engage a plane or surface, the mirror 34 will be tilted in accordance with the angular relation of the plane, and such tilting will alter the path of the light rays from the mirror 34 to the mirror 35 and then back to the mirror 34 and finally to the screen 21. Here again the movement of the pinhole image will be magnified four times by the mirrors, and may be further magnified at the screen by the lens 19a.

The method of testing the angular difference of a surface of an object 54 from a master surface is as follows: a master member or standard piece is first placed on the base 26 or the test block 55 until the upper surface of the master or standard member engages the three contact points 70 carried by the plate 68. The adjusting screw 42 is then adjusted to move the plate 40 and mirror 35 to zero the instrument to thus bring the image of the pinhole on the intersection of the lines 23 and 35, as shown at 71, Fig. 2. The master surface is then removed and is replaced by the member or object 54 to be tested. The latter is positioned so that the three contact points 70 engage the upper surface 72 thereof, as shown in Fig. 4. If the surface 72 varies in one direction relative to the master surface the image of the pinhole 15 may be positioned along the vertical line 25, the exact position depending, of course, on the amount of the difference, but if, on the other hand, the angular difference lies at right angles to that mentioned above, the image of the pinhole will lie along the horizontal line 23 to the right or left of the zero position 71 depending on the direction of variation. If, however, the surface is inclined in two directions, the pinhole image may lie along an inclined line positioned somewhere between the lines 23 and 25. In this case, the projections of the image on the lines 23 and 25 may be read to determine the angular differences. It is desirable, however, in such a case, to rotate the object 54 so that the pinhole image lies on either the lines 23 or 25 and the angular difference may then be read directly, as shown in the drawing. By means of this arrangement the angular difference between the surface tested and the master surface can be readily and easily and quickly determined. Furthermore, as this difference is magnified four times by the mirrors and may be further magnified by the lens 19a, as mentioned above, it can be readily read directly from the scales which, preferably, are calibrated in minutes of arc. Thus the angular difference can be measured to a few seconds of arc, the advantages of which are obvious.

In addition to readily indicating both lineal and angular differences, the comparator of the present invention can be used by unskilled or semi-skilled help to inspect a large number of objects in a short period of time with a great degree of accuracy. Furthermore, the parts are rugged in construction yet may be readily adjusted to provide the desired zero readings. It is obvious, of course, that the instrument may not be zeroed when the master object or surface is in position. In such a case the lineal and/or angular differences are then the differences in the scale readings caused by the master object or surface and the object or surface being tested. It is more convenient, however, to first zero the instrument and then the difference can be read directly from the scales. This is particularly true when a large number of parts are to be rapidly and accurately compared with a standard or master part.

While several embodiments of the invention have been disclosed, it is contemplated that the inventive idea may be carried out in a number of

I claim:

1. In an optical comparator, the combination with an auto-collimating telescope having an objective, a pinhole plate and illuminating means therefor, of a mirror movably connected to said telescope beyond said objective and in the path of light rays proceeding from said plate and passing through said objective, a second mirror movably mounted on said telescope and cooperating with said first mirror to reflect said rays back through said objective, viewing means positioned in the path of the reflected rays, means carried by said first mirror for contacting an object to be compared for moving said first mirror relative to said second mirror and telescope to alter the path of the reflected rays to indicate at said viewing means the deviation of said object from a master object, and means for adjusting said second mirror to zero said comparator when said contacting means engages a master object.

2. In an optical comparator, the combination with an auto-collimating telescope having an objective, a pinhole plate and illuminating means therefor, of a pair of angularly arranged mirrors carried by said telescope and positioned beyond said objective and in the path of light rays proceeding from said plate and passing through said objective, said mirrors serving, after a double reflection, to direct said rays back through said objective, viewing means positioned in the path of said reflected rays, means for movably connecting one of said mirrors to said telescope, means carried by said one mirror for contacting an object to be compared to move said one mirror in proportion to the variation of said object from a master object to vary the path of the reflected rays to thereby indicate said variation at said viewing means, and means for adjusting the other mirror to bring said reflected rays to a predetermined position when said contacting means engages said master object.

3. In an optical comparator, the combination with an auto-collimating telescope having an objective, a pinhole plate and illuminating means therefor, of a totally reflecting mirror movably connected to said telescope beyond said objective and inclined to the axis thereof but positioned in the path of light rays proceeding from said plate and passing through said objective, a second mirror carried by said telescope and positioned in optical alignment with said first mirror and cooperating therewith to reflect said rays back through said objective, a viewing means positioned in the path of said reflected rays, means carried by said first mirror for contacting an object to vary the position of said first mirror relative to said second mirror to indicate at said viewing means the variation of said object from a master object, a yieldable connection between said second mirror and said telescope, and means for moving said second mirror about said connection and relative to said first mirror to zero said comparator when said contacting means is in engagement with said master object.

4. In an optical comparator, the combination with an auto-collimating telescope having an objective, a pinhole plate and illuminating means therefor, of a mirror movably connected to said telescope beyond said objective and in the path of light rays proceeding from said plate and passing through said objective, a second mirror movably mounted on said telescope and cooperating with said first mirror to reflect a magnified image of said pinhole back through said objective, a viewing screen, a projection lens positioned in the path of said reflected rays for projecting said magnified image of said pinhole on said screen, means carried by said first mirror for contacting an object to be compared to vary the position of said first mirror to alter the path of the reflected rays to indicate on said screen the variation of said object from a master object, and means for adjusting said second mirror relative to said first mirror when said contacting means engages said master object to zero said reflected rays on said screen.

5. In an optical comparator, the combination with an auto-collimating telescope having an objective and an illuminated target, of a totally reflecting mirror positioned beyond said objective and in the path of light rays proceeding from said target and passing through said objective, a spring hinge for movably connecting one edge of said mirror to said telescope adjacent said objective, a second mirror positioned in optical alignment with said first mirror and cooperating with the latter to reflect said rays back through said objective, a yieldable connection between said second mirror and said telescope, viewing means positioned in the path of the reflected rays, an arm carried by said first mirror adjacent said hinge, a contact member on said arm adapted to engage an object to be compared to move said first mirror about said hinge and relative to second mirror to vary the path of the reflected rays to indicate at said viewing means the deviation of said object from a master object, and means for adjusting said second mirror about said connection to move said reflected rays to a zero position when said contact member engages said master object.

6. In an optical comparator, the combination with an auto-collimating telescope provided with an objective and an illuminated target, of a totally reflecting mirror positioned in inclined relation to the optical axis of said telescope beyond said objective but in the path of light rays proceeding from said target and passing through said objective, means for loosely and yieldably supporting said mirror on said telescope, a second mirror positioned in optical alignment with said first mirror and cooperating therewith to reflect said rays after a double reflection back through said objective, a viewing member positioned in the path of the reflected rays, means for connecting said second mirror to said telescope, and a plurality of contact points arranged on said mirror in a plane and adapted to engage a surface to be tested to move said first mirror relative to said second mirror, telescope, and objective to indicate at said viewing means the angular variation of said surface from a master surface.

7. In an optical comparator, the combination with an auto-collimating telescope provided with an objective, and an illuminating target, of a totally reflecting mirror positioned in inclined relation to the optical axis of said telescope beyond said objective but in the path of light rays proceeding from said target and passing through said objective, means for loosely and yieldably supporting said mirror on said telescope, a second mirror positioned in optical alignment with said first mirror and cooperating therewith to reflect said rays after a double reflection back through said objective, a viewing member positioned in the path of the reflected rays, a yieldable connection between said second mirror and said telescope, a plurality of contact points arranged in a plane and adapted to engage a surface to be tested to move said first mirror relative to said second mirror to indicate at said viewing means the angular variation of said surface from a master surgical face, and means for adjusting said second mirror about said connection to zero said comparator when said points are in contact with said master surface.

8. In an optical comparator, the combination with an auto-collimator telescope provided with an illuminated target and an objective through which parallel light rays from said target pass, of an inclined mirror positioned in the path of a portion of said rays beyond said objective, a spring hinge for connecting one edge of said mirror to said telescope, a second mirror in optical alignment with said first mirror and adapted to cooperate therewith to direct the rays incident on said first mirror after a double reflection back through said objective, viewing means positioned in the path of said reflected rays, a third mirror movably connected to said telescope and positioned substantially in the plane of said first mirror and in the path of some of the rays passing through said objective, a fourth mirror arranged in optical alignment with said third mirror and cooperating therewith to direct after a double reflection the rays incident on said third mirror back through said objective to said viewing means, means carried by said first mirror adapted to contact an object the linear variation of which is to be tested to move said first mirror to vary the path of the rays reflected therefrom to said viewing means to indicate the lineal variation of said object from the lineal dimension of a master object, a plurality of planar contact points carried by said third mirror and adapted to engage a surface the angular deviation of which is to be measured to move said third mirror relative to said fourth mirror to vary the path of the rays reflected therefrom toward said viewing means to indicate the angular variation of said surface from a master surface.

9. In an optical comparator, the combination with an auto-collimating telescope provided with an illuminated target and an objective through which parallel light rays from said target pass, of an inclined mirror positioned in the path of a portion of said rays beyond said objective, a spring hinge for connecting one edge of said mirror to said telescope, a second mirror in optical alignment with said first mirror and adapted to cooperate therewith to direct the rays incident on said first mirror after a double reflection back through said objective, a third mirror movably mounted on said telescope and positioned substantially in the plane of said first mirror and in the path of some of the rays passing through said objective, a fourth mirror arranged substantially in the plane of said second mirror and in optical alignment with said third mirror and cooperating with the latter to direct after a double reflection the rays incident on said third mirror back through said objective, a single contact member carried by said first mirror and adapted to engage an object the lineal dimension of which is to be tested to vary the position of said first mirror relative to said second mirror to alter the path of the rays reflected from said first and second mirrors, a plurality of planar contact points carried by the third mirror and adapted to engage a surface to be tested to vary the position of said third mirror relative to said fourth mirror to alter the path of the rays reflected by and from said third and fourth mirrors, a viewing screen positioned in the path of said reflected rays, a projection lens for forming an image of said target on said screen to indicate the lineal variation of said object from a master object or the angular variation of the surface from a master surface, yieldable connections between said second and fourth mirrors and said telescope, and means for separately adjusting said second and fourth mirrors about said connections to zero the comparator with relation to a master object and a master surface when engaged by said member and points respectively.

10. In an optical testing device, the combination with an autocollimating telescope having an objective, a light source for said telescope for directing a beam of light through the telescope and said objective, of a pair of angularly arranged mirrors positioned beyond said objective and in the path of the light rays passing therethrough, said mirrors serving, after a double reflection, to direct said beam back through said objective and telescope, viewing means positioned in the path of said reflected rays, one of said mirrors being fixedly mounted in said path, and means carried by the other mirror for contacting an object to be tested so that movement of said other mirror in response to variations of said object from a standard will alter the path of the reflected ray to indicate said variations at said viewing means.

11. In an optical testing device, the combination with an auto-collimating telescope having an objective, a light source for said telescope for directing a beam of light through the telescope and said objective, of a reflecting mirror positioned beyond said objective and inclined to the axis thereof but arranged in the path of the beam passing through said objective, a second mirror inclined relative to but positioned in optical alignment with said first mirror and cooperating therewith to reflect said beam back through said objective and telescope, one of said mirrors being stationary relative to said telescope, viewing means positioned in the path of the reflected beam, and means carried by the other mirror for contacting an object to be tested so that movement of said other mirror in response to variations of said object from a standard will alter the path of the reflected ray to indicate said variations at said viewing means, said contacting means when in contact with said standard serving to move said other mirror to zero said device.

JOHN R. TURNER.

REFERENCES CITED

The following references are of record in the file of this patent:

UNITED STATES PATENTS

| Number | Name | Date |
| --- | --- | --- |
| 1,670,310 | Miller | May 22, 1928 |
| 1,736,682 | Tuckerman | Nov. 19, 1929 |
| 1,756,785 | Gallasch | Apr. 29, 1930 |
| 1,854,760 | Paulson | Apr. 19, 1932 |
| 1,977,027 | Vaughan | Oct. 16, 1934 |
| 2,038,914 | Templeton | Apr. 28, 1936 |
| 2,150,398 | Paulson | Mar. 14, 1939 |
| 2,224,281 | Webber | Dec. 10, 1940 |
| 2,305,775 | Hansen | Dec. 22, 1942 |

FOREIGN PATENTS

| Number | Country | Date |
| --- | --- | --- |
| 338,206 | Germany | June 15, 1921 |